United States Patent
Davison

(10) Patent No.: US 12,221,325 B2
(45) Date of Patent: Feb. 11, 2025

(54) DEVICE AND METHOD OF CALCULATING CRANE CAPACITY

(71) Applicant: Stellar Industries, Inc., Garner, IA (US)

(72) Inventor: Timothy J. Davison, Garner, IA (US)

(73) Assignee: Stellar Industries, Inc., Garner, IA (US)

( * ) Notice: Subject to any disclaimer, the term of this patent is extended or adjusted under 35 U.S.C. 154(b) by 578 days.

(21) Appl. No.: 17/024,771

(22) Filed: Sep. 18, 2020

(65) Prior Publication Data

US 2021/0078838 A1 Mar. 18, 2021

Related U.S. Application Data

(60) Provisional application No. 62/901,847, filed on Sep. 18, 2019.

(51) Int. Cl.
| | | |
|---|---|---|
| *G01G 19/14* | (2006.01) | |
| *B66C 13/16* | (2006.01) | |
| *G01S 11/08* | (2006.01) | |
| *G01S 13/76* | (2006.01) | |

(52) U.S. Cl.
CPC .............. *B66C 13/16* (2013.01); *G01G 19/14* (2013.01); *G01S 11/08* (2013.01); *G01S 13/76* (2013.01)

(58) Field of Classification Search
CPC ........ G01G 19/08; G01G 19/12; G01G 19/14; B66C 13/16; B66C 23/905; G01S 17/08; G01S 13/08; G01S 15/08; G01S 11/08; G01S 13/76

USPC ........................................................... 701/50
See application file for complete search history.

(56) References Cited

U.S. PATENT DOCUMENTS

| | | | | |
|---|---|---|---|---|
| 4,178,591 A | * | 12/1979 | Geppert ................ | B66C 23/905 340/685 |
| 4,516,116 A | * | 5/1985 | White .................... | G01G 23/36 340/685 |
| 4,623,029 A | * | 11/1986 | Bambauer .............. | G01G 19/08 177/210 R |
| 5,771,978 A | * | 6/1998 | Davidson ................ | E02F 3/847 701/50 |
| 6,016,455 A | * | 1/2000 | Ohtomo ............... | G01C 15/004 356/73 |
| 6,378,276 B1 | * | 4/2002 | Dorge .................... | G01G 19/08 177/136 |
| 6,427,780 B1 | * | 8/2002 | Kimura ................... | G01S 17/74 701/50 |

(Continued)

OTHER PUBLICATIONS

"Surveying 2 Distance" PDF file from the University of Memphis, Downloaded Jan. 16, 2024.*

(Continued)

*Primary Examiner* — Randy W Gibson
(74) *Attorney, Agent, or Firm* — David M. Breiner; BrownWinick Law Firm

(57) ABSTRACT

A method of calculating crane capacity is disclosed. The method may include the steps of placing a handheld device near a load, prompting the handheld device to send a signal to a receiver, receiving a signal from the receiver, calculating a distance from the handheld device to the receiver based on at least the signal from the receiver, and using the distance to calculate the crane capacity, wherein the receiver is arranged near or on a crane mast.

14 Claims, 5 Drawing Sheets

(56) References Cited

U.S. PATENT DOCUMENTS

| | | | | |
|---|---|---|---|---|
| 8,306,705 B2* | 11/2012 | Nichols | ............... | E02F 9/264 |
| | | | | 340/572.1 |
| 8,363,210 B2* | 1/2013 | Montgomery | ......... | G01C 21/04 |
| | | | | 324/67 |
| 9,511,983 B2* | 12/2016 | Eidenberger | ............ | B66C 13/16 |
| 2005/0057745 A1* | 3/2005 | Bontje | ................ | G01C 15/002 |
| | | | | 356/139.03 |
| 2016/0076228 A1* | 3/2016 | Nau | ....................... | E02F 3/842 |
| | | | | 701/50 |
| 2019/0154818 A1* | 5/2019 | Haeberle | ................ | G01S 17/08 |

OTHER PUBLICATIONS

"Basic Surveying Manual:" from the Transportation Information Center at Michigan Technological University, copyright 2002.*

\* cited by examiner

DEVICE AND METHOD OF CALCULATING CRANE CAPACITY

CROSS-REFERENCE TO RELATED APPLICATIONS

This application claims the benefit of U.S. Provisional Patent Application No. 62/901,847 which was filed with the United States Patent and Trademark Office on Sep. 18, 2019, the entire contents of which are herein incorporated by reference.

BACKGROUND

1. Field

Example embodiments relate to a device usable for calculating crane capacity and a method using the device.

2. Description of the Related Art

Cranes are machines used for moving heavy objects by suspending them from a projecting arm often called a boom. The booms are generally pivoted at one end allowing an operator to change an angle at which the boom is utilized. Some booms are telescopic in nature allowing a crane operator to not only change an angle of the boom but a length as well.

FIG. 1 is a view of a utility vehicle 100 upon which a crane 200 is mounted. The utility vehicle 100 may include stabilizers 110 to stabilize the vehicle 100 while the crane 200 is being operated. As shown in FIG. 1, the crane 200 has a base 210 to which a telescoping boom 220 may attach. The telescoping boom 220 includes a main section 222, an intermediate section 224, and an end section 226 upon which a horsehead 228 is mounted. A cable 230 runs along a length of the boom 220 and across the horsehead 228 to a load 300 which may be lifted by the crane 200. The crane 200 may include an actuator 240, for example, a hydraulic cylinder, which may control an angle of the boom 220. Other actuators (not shown) are present to control a length of the boom 220.

As one skilled in the art would readily appreciate, the load 300 carried by the boom 220 creates a moment M at the base 210 of the crane 200. The moment M may be a function of the boom length BL and the angle the boom 220 is oriented. This moment M creates stresses at the inward side IS of the boom 220. The greater the moment M, the greater the stress. Furthermore, relatively large moments M must be overcome by crane actuators in order to move the load 300. For example, actuator 240 may have to provide a relatively high force to overcome the moment M caused by load 300. In addition, if the moment M is too high, the crane utility vehicle 100 may inadvertently tip over.

Some crane manufacturers provide buyers with capacity charts allowing them to determine how much load 300 a crane 200 may take given a crane's boom length BL and orientation θ. FIG. 2, for example, illustrates an example of capacity chart typically supplied by manufacturers. Alternatively, a crane operator may manually calculate a crane's capacity using mathematics in relation to the crane's load chart. In this latter method, a crane operator may measure a distance from the crane rotation system, for example, the crane mast 205, to a given load 300 using, for example, a tape measure. In some prior art systems an operator may alternatively un-stow the crane boom 200 and place the crane boom tip 229 at the given load 300 and the crane's electronics suite can determine the distance of the load 300 at the boom tip 229. This same electronics suite can run a Load Moment Indicator (LMI) calculation to determine the capacity at the crane tip location 229.

SUMMARY

Conventional crane operation is generally safe. However, it is relatively difficult and time consuming to determine a capacity of a crane using the methods described above. For example, a crane operator may incorrectly measure a distance from a crane boom tip to the crane mast thereby leading to an incorrect calculation of crane capacity. As yet another example, a crane operator may make a mistake in calculating a crane's capacity even if the correct length measurement was taken. So far as extending a tip of the crane over a load, this can be a relatively time consuming process. In view of the foregoing, the inventor of this application has set out to find a new method of quickly assessing a capacity of a crane at a load location.

In accordance with example embodiments, a method of calculating crane capacity may include placing a handheld device near a load, prompting the handheld device to send a signal to a receiver, receiving a signal from the receiver, calculating a distance from the handheld device to the receiver based on at least the signal from the receiver, and using the distance to calculate the crane capacity, wherein the receiver is arranged near or on a crane mast.

In accordance with example embodiments, a handheld device may include a transmitter to emit a signal, a receiver to receive a return signal, a processor configured to automatically calculate a distance from the handheld device to a target and calculate a capacity of a crane based on the calculated distance.

BRIEF DESCRIPTION OF THE DRAWINGS

Example embodiments are described in detail below with reference to the attached drawing figures, wherein.

DETAILED DESCRIPTION

Figure 1:
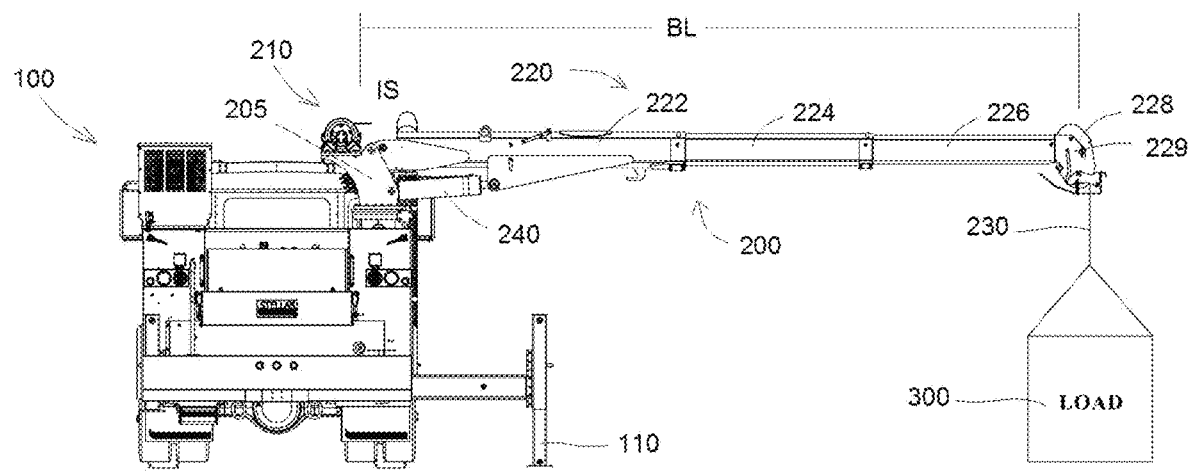
FIG. 1 is a view of a utility vehicle with a crane thereon.
Figure 2:
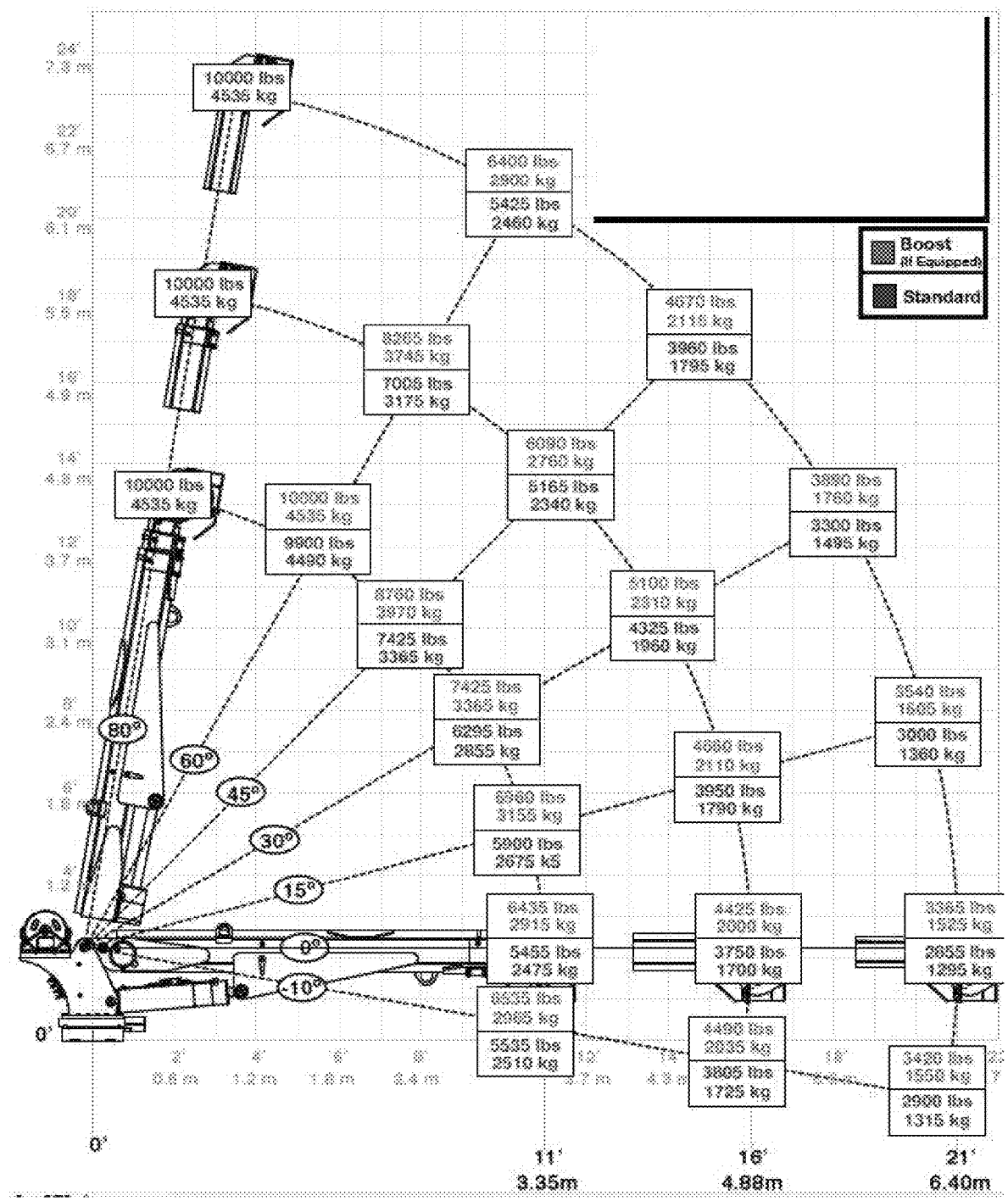
FIG. 2 is a view of crane capacity chart.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on,"

"directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to device usable for calculating a crane capacity and a method using the device.

Figure 3:
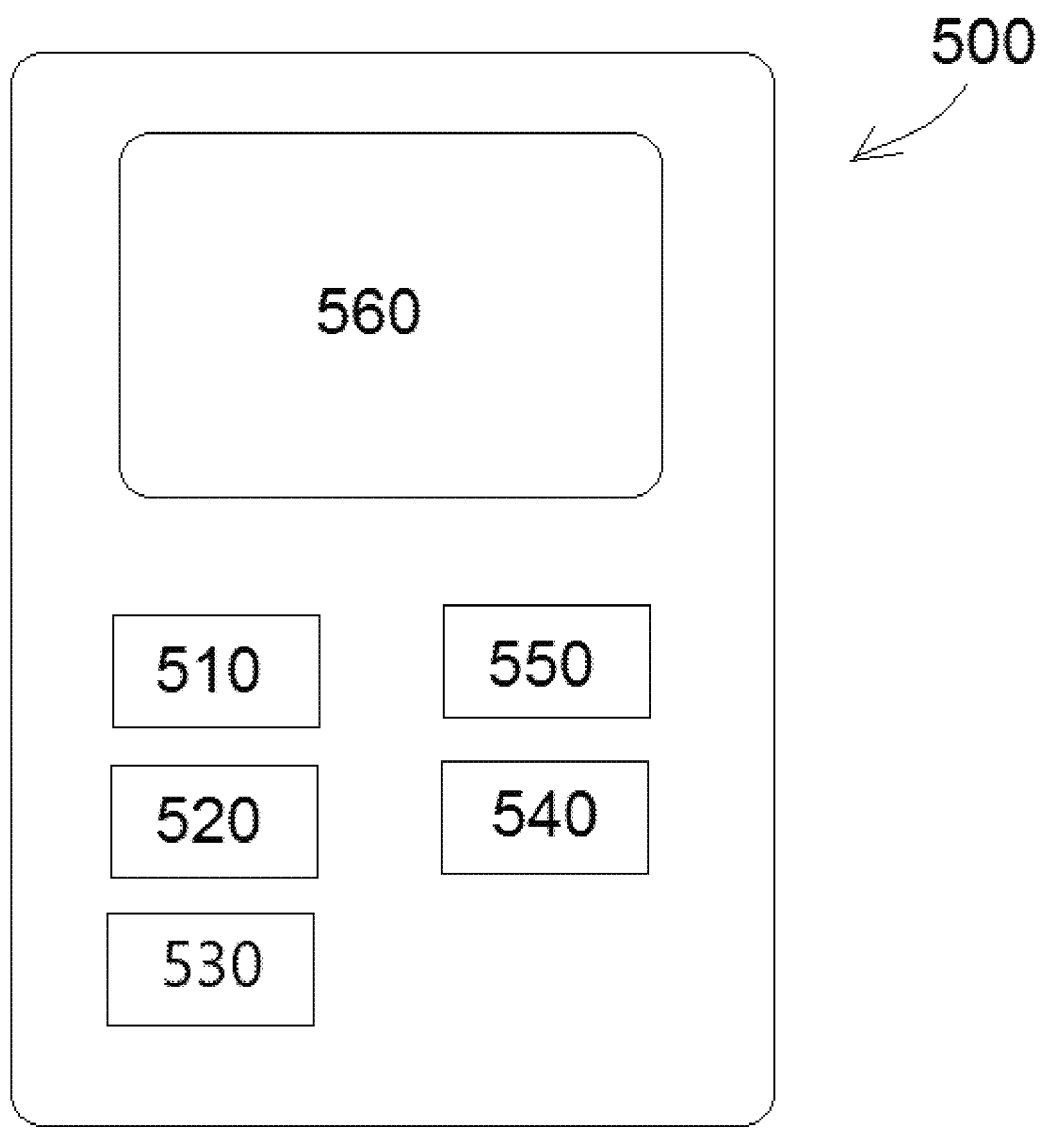
FIG. 3 is a view of a device in accordance with an example of the invention.
Figure 4:
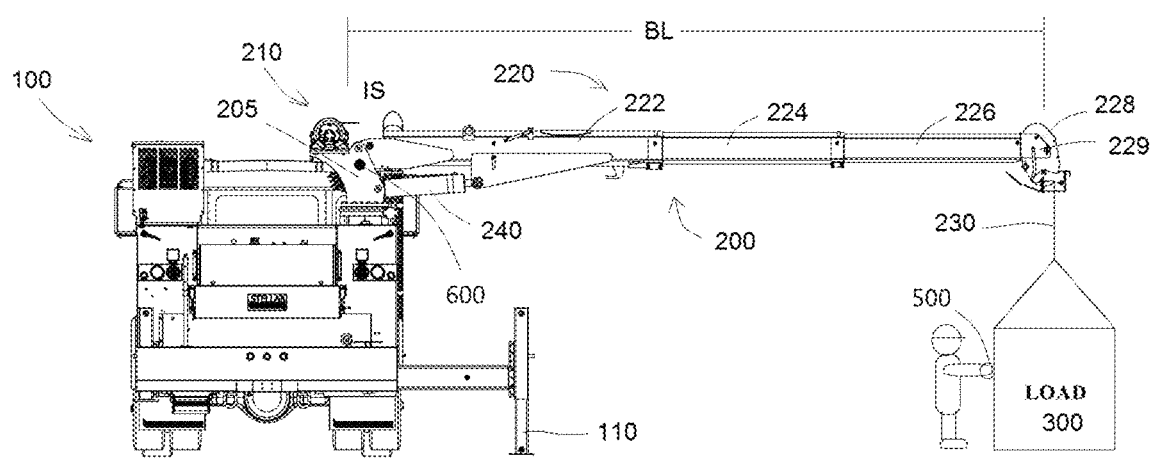
FIG. 4 is a view of a utility vehicle with a crane thereon, the crane having a receiver configured to generate a signal.
Figure 5:
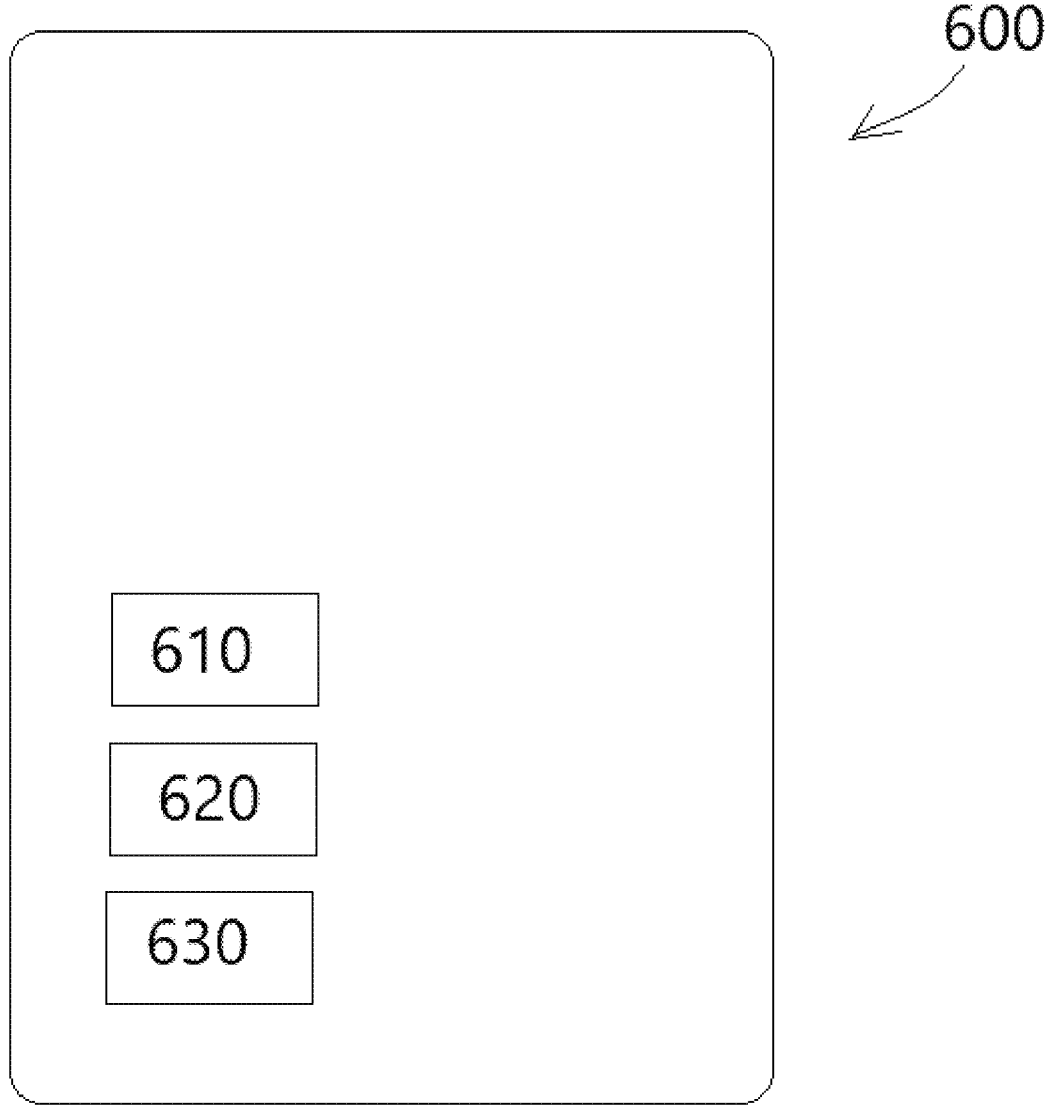
FIG. 5 is a view of a receiver in accordance with example embodiments.

FIG. 3 is a view of a hand-held device 500 in accordance with example embodiments. In FIG. 3, the device 500 is illustrated as including a microprocessor 510, a memory chip 520, an antenna 540, a transmitter 550, and a user interface 560. In example embodiments the memory chip 520 may include data for various types of cranes and the microprocessor 510 may be configured to utilize this data to compute a crane capacity at a determined distance. The user interface 560 may be used by an operator to enter data into the device 500 and receive data from the device 500.

Table 1, is a nonlimiting example embodiment of data which may be stored in the memory chip 520. In this nonlimiting example embodiment, the first column indicates a type of crane produced by a manufacturer and columns 2, 3, and 4 store coefficients of a second order polynomial usable for calculating a crane capacity given a distance in feet. The equation may, for example, take on the form Crane Capacity (lbf)=$C1+C2X+C3X^2$, where X is a distance (in feet) from a load to a crane mast.

TABLE 1

| Crane Type | C1 | C2(X) | C3($X^2$) |
|---|---|---|---|
| Stellar-1 | 14201 | −915 | 19 |
| Stellar-2 | 10941 | −531.42 | 8.1791 |

For example, if an operator is using a Stellar-1 crane in the field and has determined that a distance from the crane mast to a load is 16 feet, the user may enter the type of crane and distance into the device 500 via the interface 560. The microprocessor 510 may use this data to look up the proper coefficients stored in the memory chip 520 and the microprocessor may calculate the crane capacity at 16 feet as 14201−915*16+19*162=4425 lbf. As another example, if an operator is using a Stellar-2 type crane in the field and has determined that a distance from the crane mast to a load is 25 feet the device 500 may calculate the crane capacity at 25 feet as 10941−531.42*25+8.1791*252=2767 lbf.

In one nonlimiting example of the device 500, the device 500 is configured to determine a distance from a load to a crane mast 205. Example embodiments anticipates several ways of doing this. In one nonlimiting example embodiment, the device 500 generates a signal, for example, a radio wave, or laser light, which is transmitted to a receiver 600 arranged on a crane mast 205. In this example embodiment, the device 500 includes a reference clock 530 which is activated when the device 500 generates the signal and which records how long it takes a signal, for example, a reflected signal, from the receiver 600 to reach the device 500. From this amount of time, a resulting distance may be accurately measured. The device 500 may, thereafter, use this distance information to calculate crane capacity. Thus, in this example embodiment, an operator may simply walk to a location of a load, enter the type of crane into the device 500 via the user interface, prompt the device 500 to determine a distance from the device 500 to the crane mast 205 by prompting the device 500 to send a signal to a receiver 600 on the crane mast 205, receive a signal from the receiver 600 (for example, a reflected signal), determine a distance from the device 500 to the receiver 600 utilizing the time it took for the device 500 to receive the signal form the receiver 600, and thereafter using this measurement to calculate the crane capacity.

It is understood there are many ways to calculate a crane capacity and the above example is for purposes of illustration only. For example, rather than using polynomials to approximate a load capacity, more sophisticated mechanics equations may be used. However, what is particularly novel about the inventor's system is the ability of an operator to walk a device 500 to a location and use the device to calculate the capacity of the crane at that location without having to take a physical measurement or un-stow a crane.

In example embodiments, the receiver 600 may include circuitry enabling it to generate a signal when provoked by a signal generated by the device 500. By way of nonlimiting example only, the receiver 600 may resemble a passive or active receiver tag which generates a signal upon receipt of the transmission by the transmitter 550. A passive receiver, for example, may be a receiver 600 which is energized by the transmission by the transmitter 550 similar to that of a passive RFID tag whereas an active receiver has a power source, for example, a battery, to power the receiver 600. In example embodiments, the receiver 600 may have an antenna 610 for receiving a signal from the device 500 and a transmitter 620 for sending a return signal to the device 500. The signal generated by the transmitter 620 may include time information reflecting a time the signal sent by the transmitter 620 is sent to the device 500 and the device 500 may use this information to determine how long it took for the signal to reach the device 500 from the transmitter 620.

The receiver 600 may include a memory 630 which may record the type of crane the receiver 600 is associated with.

The memory 630 may include information such as the type of crane the receiver 600 is associated with and the receiver 600 may transmit this information to the device 500 in response to receiving the signal from the device 500. In this latter embodiment, transmitting the crane information may include transmitting information usable by the device 500 to calculate crane capacity. For example, rather than storing the previously described coefficients in the memory of the handheld device 500, the coefficients may be stored in the memory 630 of the receiver 600 which may transmit the coefficients to the handheld device 500 when the receiver 600 receives the signal from the handheld device 500. The memory 630, of course may store additional information or alternative information regarding the crane which may help the handheld device 500 determine the crane capacity. This may save the user from having to input a type of crane into the handheld device 500.

In example embodiments it has been shown the receiver 600 may be attached to a crane mast 205, however, this is not intended to limit the invention. For example, the receiver 600 may be attached to a wall of the utility vehicle 100 near the crane mast 205.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

I claim:

1. A method of calculating crane capacity of a crane, the method comprising:
   arranging a utility truck having the crane near a load intended to be lifted by the crane;
   placing a handheld device near the load, the handheld device having a user interface and a transmitter to transmit a signal;
   transmitting the signal from the handheld device to the utility truck, the utility truck having an electronic memory storing information regarding characteristics of the crane; and
   calculating the crane capacity of the crane using a processor, wherein the processor calculates crane capacity using the signal to determine a distance from the handheld device to the utility truck and the information regarding the characteristics of the crane stored in the memory of the utility truck, and the utility truck has a transmitter configured to send a signal to the handheld device for reception by a user through the user interface, wherein the handheld device uses the signal from the transmitter of the utility truck to display, on the user interface, information indicating the capacity of the crane.

2. The method of claim 1, wherein the utility truck includes an antenna for receiving the signal from the handheld device.

3. The method of claim 1, wherein a user causes the handheld device to transmit the signal to the utility truck through the user interface.

4. The method of claim 1, wherein the utility truck includes an active receiver having a power source to receive the signal from the handheld device.

5. The method of claim 1, wherein the utility truck includes a passive receiver for receiving the signal from the handheld device.

6. The method of claim 1, wherein the processor utilizes at least the signal from the handheld device to the utility truck to calculate the crane capacity.

7. The method of claim 1, wherein information regarding the characteristics of the crane include information usable in calculating crane capacity.

8. The method of claim 7, wherein the information includes coefficients usable by the processor for calculating crane capacity.

9. A system comprising:
   a utility vehicle having a crane with a crane mast;
   an antenna on the utility vehicle;
   a handheld device having a user interface and a first transmitter, the first transmitter configured to send a first signal to the antenna of the utility vehicle;
   a second transmitter configured to send a second signal to the handheld device, the second transmitter on the utility vehicle;
   a memory having data usable for calculating capacity of the crane, the memory being arranged in the utility vehicle;
   a processor configured to calculate capacity of the crane, the processor using at least the first signal and the data in the memory to calculate crane capacity, wherein the handheld device is configured to use information from the second signal to generate information regarding a condition of the crane on the user interface of the handheld device.

10. The system of claim 9, wherein the condition of the crane is one of the crane being at capacity, under capacity, or over capacity.

11. The system of claim 9, wherein the second transmitter is arranged at the crane mast.

12. The system 9, wherein the second transmitter and the antenna are integrated into a receiver.

13. The system of claim 9, wherein data stored in the memory used to calculate crane capacity includes load characteristics data.

14. The system of claim 13, wherein the load characteristics data includes coefficients usable for calculating crane capacity.

* * * * *